United States Patent [19]
Newkirk et al.

[11] Patent Number: 5,516,595
[45] Date of Patent: May 14, 1996

[54] PRODUCTION OF CERAMIC AND CERAMIC-METAL COMPOSITE ARTICLES WITH SURFACE COATINGS

[75] Inventors: Marc S. Newkirk, Newark, Del.; Adam J. Gesing, Kingston, Canada; Michael A. Rocazella; Christopher R. Kennedy, both of Newark, Del.; Daniel J. Frydrych, Wilmington, Del.; Robert A. Wolffe; Paul V. Kelsey, both of Wilmington, Del.; Alvin P. Gerk, Newark, Del.

[73] Assignee: Lanxide Technology Company, LP, Newark, Del.

[21] Appl. No.: 341,336

[22] Filed: Nov. 16, 1994

Related U.S. Application Data

[63] Continuation of Ser. No. 822,775, Jan. 21, 1992, abandoned, which is a continuation-in-part of Ser. No. 790,786, Nov. 12, 1991, abandoned, which is a continuation of Ser. No. 449,526, Dec. 12, 1989, Pat. No. 5,064,788, which is a continuation of Ser. No. 908,124, Sep. 16, 1986, Pat. No. 4,948,764.

[51] Int. Cl.⁶ ..................................................... B32B 18/00
[52] U.S. Cl. ........................... 428/697; 428/698; 428/699; 428/702; 428/307.7; 428/312.8; 428/314.2; 428/317.9; 428/319.1; 428/411.1; 428/413; 428/421; 428/426; 501/93; 501/97; 501/98
[58] Field of Search ........................... 428/446, 688, 428/689, 697, 698, 702, 699, 309.3, 307.7, 312.2, 312.8, 314.2, 314.4, 317.9, 319.1, 411.1, 413, 421; 501/89, 92, 93, 94, 96, 97, 98, 133

[56] References Cited

U.S. PATENT DOCUMENTS

| | | | |
|---|---|---|---|
| 2,741,822 | 4/1956 | Udy | 25/157 |
| 3,031,340 | 4/1962 | Girardot | 117/118 |
| 3,255,027 | 6/1966 | Talsma | 106/65 |
| 3,296,002 | 1/1967 | Hare | 106/40 |
| 3,298,842 | 1/1967 | Seufert | 106/65 |
| 3,419,404 | 6/1964 | Mao | 106/65 |
| 3,421,863 | 1/1969 | Bawa et al. | 29/182.5 |
| 3,437,468 | 4/1969 | Seufert | 51/298 |
| 3,473,938 | 4/1968 | Oberlin | 106/57 |
| 3,473,987 | 10/1969 | Sowards | 156/89 |
| 3,538,231 | 3/1969 | Newkirk | 13/25 |
| 3,559,210 | 2/1971 | Hansen | 2/2.5 |
| 3,592,942 | 7/1971 | Hauck et al. | 161/44 |
| 3,608,170 | 9/1971 | Larson et al. | 29/149.5 PM |
| 3,700,534 | 10/1972 | Cook | 161/38 |
| 3,770,488 | 11/1973 | Pepper et al. | 117/47 R |
| 3,789,096 | 1/1975 | Church et al. | 264/60 |
| 3,864,154 | 2/1975 | Gazza et al. | 29/123 B |

(List continued on next page.)

FOREIGN PATENT DOCUMENTS

| | | |
|---|---|---|
| 0116809 | 8/1984 | European Pat. Off. . |
| 0155831 | 9/1985 | European Pat. Off. . |
| 0169067 | 1/1986 | European Pat. Off. . |
| 3508848 | 3/1985 | Germany . |

OTHER PUBLICATIONS

Drouzy, M. and Richard, M., "Oxidation of Molten Aluminum Alloys. Reaction with Refractories", Fonderie, France No. 332, pp. 121–128, Mar. 1974.

Clavaud, B. and Jost, V., "Refractories for Aluminum Alloy Melting Furnaces", Translated from the French by Lillian Brassinga, Jan. 11, 1985.

Primary Examiner—Ellis P. Robinson
Assistant Examiner—Timothy M. Speer
Attorney, Agent, or Firm—Kevin J. Boland

[57] ABSTRACT

The invention comprises a method of making self-supporting ceramic and ceramic composite structures by the oxidation reaction of a body of molten parent metal precursor with a vapor-phase oxidant to form an oxidation reaction product. This reaction or growth is continued to form a thick, self-supporting ceramic or ceramic composite body. The body is recovered and in a separate subsequent operation, at least a portion of a surface is coated with one or more materials in order to effect desired changes in the properties of the surface, e.g., hardness, corrosion resistance.

31 Claims, 1 Drawing Sheet

U.S. PATENT DOCUMENTS

| | | | |
|---|---|---|---|
| 3,868,267 | 2/1975 | Gazza et al. | 117/22 |
| 3,922,474 | 11/1975 | Brown | 428/457 |
| 3,963,839 | 6/1976 | Freller | 427/251 |
| 3,969,553 | 7/1976 | Kondo et al. | 427/299 |
| 3,973,977 | 8/1976 | Wilson | 106/62 |
| 4,323,000 | 4/1982 | Dennis et al. | 89/36 A |
| 4,713,360 | 12/1987 | Newkirk | 501/98 |
| 4,739,690 | 4/1988 | Moskowitz | 89/36.02 |
| 4,774,103 | 8/1988 | Kamigaito et al. | 427/38 |
| 4,818,635 | 4/1989 | Ekstrom et al. | 428/698 |
| 4,832,888 | 5/1989 | Sato et al. | 264/63 |
| 4,843,040 | 6/1989 | Oda et al. | 501/92 |
| 4,923,832 | 5/1990 | Newkirk | 501/98 |
| 4,948,764 | 8/1990 | Newkirk et al. | 501/127 |
| 4,953,442 | 9/1990 | Bartuski | 89/36.02 |

PRODUCTION OF CERAMIC AND CERAMIC-METAL COMPOSITE ARTICLES WITH SURFACE COATINGS

This is a continuation of application Ser. No. 07/822,775 filed on Jan. 21, 1992, which is a continuation-in-part of U.S. Ser. No. 07/790,786, filed Nov. 12, 1991, and now abandoned, which is a continuation of U.S. Ser. No. 07/449,526, filed Dec. 12, 1989, and which issued on Nov. 12, 1991, as U.S. Pat. No. 5,064,788, which is a continuation of U.S. Ser. No. 06/908,124, filed Sep. 16, 1986, and issued on Aug. 14, 1990, as U.S. Pat. No. 4,948,764, and which is now abandoned.

The present invention relates to novel ceramic structures and to novel methods of making the same. In particular, the invention relates to ceramic and ceramic composite structures having a surface coating which effects desired changes to the surface properties.

BACKGROUND OF THE INVENTION AND COMMONLY OWNED PATENTS AND PATENT APPLICATIONS

In recent years, there has been an increasing interest in the use of ceramics for structural applications historically served by metals. The impetus for this interest has been the superiority of ceramics with respect to certain properties, such as corrosion resistance, hardness, modulus of elasticity, and refractory capabilities, when compared with metals.

Current efforts at producing higher strength, more reliable, and tougher ceramic articles are largely focused upon (1) the development of improved processing methods for monolithic ceramics and (2) the development of new material compositions, notably ceramic matrix composites. A composite structure is one which comprises a heterogeneous material, body or article made of two or more different materials which are intimately combined in order to attain desired properties of the composite. For example, two different materials may be intimately combined by embedding one in a matrix of the other. A ceramic matrix composite structure typically comprises a ceramic matrix which incorporates one or more diverse kinds of filler materials such as particulates, fibers, rods, and the like.

There are several known limitations or difficulties in substituting ceramics for metals, such as scaling versatility, capability to produce complex shapes, satisfying the properties required for the end use application, and costs. Several patents and patent applications assigned to the same owner as this application (hereinafter referred to as Commonly Owned Patents and Patent Applications), overcome these limitations or difficulties and provide novel methods for reliably producing ceramic materials, including composites. The method is disclosed generically in Commonly Owned U.S. Pat. No. 4,713,360 which issued on Dec. 15, 1987, and was based on U.S. application Ser. No. 818,943, filed Jan. 15, 1986, which is a continuation-in-part of Ser. No. 776,964, filed Sep. 17, 1985, now abandoned which is a continuation-in-part of Ser. No. 705,787, filed Feb. 26, 1985, now abandoned, which is a continuation-in-part of U.S. application Ser. No. 591,392, filed Mar. 16, 1984, now abandoned, all in the names of Marc S. Newkirk et al. and entitled "Novel Ceramic Materials and Methods of Making Same". U.S. Pat. No. 4,713,360 discloses a method of producing self-supporting ceramic bodies grown as the oxidation reaction product from a parent metal precursor. Molten metal is reacted with a vapor-phase oxidant to form an oxidation reaction product, and the metal migrates through the oxidation reaction product toward the oxidant thereby continuously developing a ceramic polycrystalline body which can be produced having an interconnected metallic component. The process may be enhanced by the use of an alloyed dopant, such as is used in the case of oxidizing aluminum doped with magnesium and silicon for oxidation reaction in air to form alpha-alumina ceramic structures. This method was improved upon by the application of dopant materials to the surface of the precursor metal, as described in Commonly Owned U.S. Pat. No. 4,853,352, which issued on Aug. 1, 1989, and is entitled "Method of Making Self-Supporting Ceramic Materials and Materials Made Thereby". U.S. Pat. No. 4,853,352 issued from U.S. patent application Ser. No. 220,935, filed Jun. 23, 1988, which was a continuation of U.S. patent application Ser. No. 822,999, filed Jan. 27, 1986, now abandoned, both of which were in the names of Marc S. Newkirk et al. and entitled "Method of Making Self-Supporting Ceramic Materials and Materials Made Thereby". U.S. patent application Ser. No. 822,999 was a continuation-in-part of Ser. No. 776,965, filed Sep. 17, 1985, now abandoned, which is a continuation-in-part of Ser. No. 747,788, filed Jun. 25, 1985, now abandoned, which is a continuation-in-part of Ser. No. 632,636, filed Jul. 20, 1984, now abandoned, all in the names of Marc S. Newkirk et al. and entitled "Methods of Making Self-Supporting Ceramic Materials".

This oxidation phenomenon was utilized in producing ceramic composite bodies as described in Commonly Owned U.S. Pat. No. 4,851,375, which issued on Jul. 25, 1989, and was entitled "Methods of Making Composite Ceramic Articles Having Embedded Filler". U.S. Pat. No. 4,851,375 issued from U.S. patent application Ser. No. 819,397, filed Jan. 17, 1986, which is a continuation-in-part of Ser. No. 697,876, filed Feb. 4, 1985, now abandoned, both in the names of Marc S. Newkirk et al. and entitled "Composite Ceramic Articles and Methods of Making Same". U.S. Pat. No. 4,851,375 discloses novel methods for producing a self-supporting ceramic composite by growing an oxidation reaction product from a metal precursor into a permeable mass of filler, thereby infiltrating the filler with a ceramic matrix. The resulting composite, however, has no defined or predetermined geometry, shape, or configuration.

A method for producing ceramic composite bodies having a predetermined geometry or shape was disclosed in Commonly Owned U.S. Pat. No. 5,017,526, which issued May 21, 1991, from U.S. patent application Ser. No. 338,471, filed Apr. 14, 1989, which was a continuation of U.S. application Ser. No. 861,025, filed May 8, 1986 (and now abandoned), both filed in the names of Marc S. Newkirk et al. A European counterpart to application Ser. No. 861,025 was published in the EPO on Nov. 11, 1987. In accordance with the method of this U.S. Pat., the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 786,660, filed Nov. 1, 1991, which was a continuation-in-part of U.S. application Ser. No. 724,236, filed Jul. 1, 1991, which was a continuation-in-part of U.S. application Ser. No. 659,523, filed Feb. 22, 1991 (and now allowed) which was a Rule 62 continuation of U.S. patent application Ser. No. 295,488, filed Jan. 10, 1989 (and now abandoned), which was a continuation of U.S. patent application Ser. No. 861,024, filed May 8, 1986, now U.S. Pat. No. 4,923,832, which issued May 8, 1990, all in the names of Marc S. Newkirk et al. A European counterpart to U.S. Pat. No.

4,923,832 was published in the EPO on Nov. 11, 1987. The methods disclosed in these patent applications and patent result in the production of shaped self-supporting ceramic bodies, including shaped ceramic composites, by growing an oxidation reaction product of a parent metal to a barrier means which is spaced apart from the metal, thereby establishing a boundary or surface.

The aforementioned Commonly Owned Patents and Patent Applications disclose methods for producing ceramic articles which overcome some of the traditional limitations or difficulties in producing ceramic articles as substitutes for metals in end-use applications.

Common to each of these Commonly Owned Patents and Patent Applications is the disclosure of embodiments of a ceramic body comprising an oxidation reaction product interconnected in one or more dimensions (usually in three dimensions) and one or more metallic constituents or components. The volume of metal, which typically includes non-oxidized constituents of the parent metal and/or metal reduced from an oxidant or filler, depends on such factors as the temperature at which the oxidation reaction product is formed, the length of time at which the oxidation reaction is allowed to proceed, the composition of the parent metal, the presence of dopant materials, the presence of reduced constituents of any oxidant or filler materials, etc. Although some of the metallic components may be isolated or enclosed, it is frequently the case that a substantial volume percent of metal will be interconnected and accessible from an external surface of the ceramic body. It has been observed for these ceramic bodies that this interconnected metal-containing component or constituent can range from about 1 to about 40 percent by volume, and sometimes higher. Such a metallic component can impart certain favorable properties to, or improve the performance of, the ceramic articles in many product applications. For example, the presence of metal in the ceramic structure may have a substantial benefit with respect to imparting fracture toughness, thermal conductivity, resilience or electrical conductivity to the ceramic or ceramic composite body. In addition, the presence of metal may also permit certain treatments (e.g., surface treatments) to occur which ordinarily may not occur absent the presence of the metal.

U.S. application Ser. No. 482,148, filed Feb. 20, 1990, now allowed, which is a continuation-in-part of Ser. No. 326,903, filed Mar. 17, 1989, now allowed, which is a continuation of Ser. No. 896,481, now U.S. Pat. No. 4,868, 143, issued on Sep. 19, 1989, and entitled "Methods of Making Ceramic Articles With A Modified Metal-Containing Component", disclose a further modification of the processes disclosed in the aforementioned Commonly Owned Patents and Patent Applications, for modifying the metallic constituents present in the aforementioned ceramic and ceramic composite bodies. In a post-treatment process, the unoxidized parent metal which is contained within the body is displaced with one or more foreign metals, chosen so as to effect desired improvements in the properties of the end product. In a preferred embodiment, displacement is effected by immersing the body in a molten pool of the foreign metal where this foreign metal has a higher melting point than the displaced parent metal.

The entire disclosures of all of the foregoing Commonly Owned Patents and Patent Applications are expressly incorporated herein by reference.

The present invention discloses a method for producing self-supporting polycrystalline ceramic structures whereby molten parent metal reacts with a vapor-phase oxidant to form an oxidation reaction product which grows progressively so as to form a polycrystalline material, optionally embedding a permeable mass of filler. The structure so produced is coated with one or more materials which effect desired changes to the surface properties of the final product.

DEFINITIONS

As used hereinafter in the specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents, most typically within a range of from about 1–40% by volume, but may include still more metal.

"Oxidation reaction product" means one or more metals in any oxidized state wherein the metal(s) has given up electrons to or shared electrons with another element, compound, or combination thereof. Accordingly, an "oxidation reaction product" under this definition includes the product of reaction of one or more metals with an oxidant such as oxygen, nitrogen, a halogen, sulphur, phosphorus, arsenic, carbon, boron, selenium, tellurium, and compounds and combinations thereof, for example, methane, ethane, propane, acetylene, ethylene, propylene (the hydrocarbon as a source of carbon), and mixtures such as air, $H_2/H_2O$ and $CO/CO_2$, the latter two (i.e., $H_2/H_2O$ and $CO/CO_2$) being useful in reducing the oxygen activity of the environment.

"Vapor-phase oxidant", which identifies the oxidant as containing or comprising a particular gas or vapor, means an oxidant in which the identified gas or vapor is the sole, predominant or at least a significant oxidizer of the parent metal under the conditions obtained in the oxidizing environment utilized. For example, although the major constituent of air is nitrogen, the oxygen content of air is the sole oxidizer for the metal precursor because oxygen is a significantly stronger oxidant than nitrogen. Air therefore falls within the definition of an "oxygen-containing gas" oxidant but not within the definition of a "nitrogen-containing gas" oxidant as those terms are used herein and in the claims. An example of a "nitrogen-containing gas" oxidant is "forming gas", which typically contains about 96 volume percent nitrogen and about 4 volume percent hydrogen.

"Parent metal" refers to the metal which reacts with the vapor-phase oxidant to form the polycrystalline oxidation reaction product, and includes that metal as a relatively pure metal or a commercially available metal with impurities; and when a specified metal is mentioned as the parent metal, e.g. aluminum, the metal identified should be read with this definition in mind unless indicated otherwise by the context.

"Coating" is not to be construed as being limited to a discrete layer on a substrate which takes no part in the formation of said layer. Rather the term refers also to "diffusion coating" in which the substrate takes part in the formation of the coating, e.g. by chemical reaction with one or more coating materials. Examples of such diffusion coating processes include aluminizing, boridizing, nitriding, carburizing, chromizing, etc. Moreover, the term refers also to "conversion coating" wherein at least one material or component external to a substrate may react with metal contained in the substrate which is, or can be made to be, accessible from the surface of the substrate.

"Chemical vapor deposition" (CVD) is a process which uses a vapor phase to transport reactive material to the surface of a substrate, wherein a chemical reaction occurs to form the coating. Normally the substrate is heated to activate the reaction, and as stated hereinabove the substrate may or may not take part in the formation of the coating.

"Physical vapor deposition" (PVD) processes use a physical effect such as evaporation or sputtering to transport material, usually a metal, from a source to the substrate to be coated. Examples of physical vapor deposition processes include:

Evaporation: The substrate to be coated is placed in a vacuum chamber with a line-of-sight to the source which is a pool of molten metal. The pool is heated either by an electron beam or by resistance heating.

Ion Plating is the same process as evaporation except that the substrate is biassed negatively with respect to the source. This usually results in a plasma region around the substrate.

Sputter Plating is a process in which material is transferred from a target and deposited on a substrate by means of ionic bombardment of the target.

SUMMARY OF THE INVENTION

The invention comprises a method of making self-supporting ceramic or ceramic composite structures by the oxidation reaction of a body of molten parent metal with a vapor-phase oxidant to form an oxidation reaction product. Molten metal is drawn through previously formed oxidation reaction product towards the oxidant to cause continued growth of the oxidation reaction product at the interface between the oxidant and the previously formed oxidation reaction product. This reaction or growth is continued to form a thick, self-supporting ceramic body. The resulting polycrystalline material consists essentially of an oxidation reaction product and, optionally, one or more non-oxidized constituents of the parent metal.

Optionally a permeable mass of filler is positioned adjacent to the parent metal body, so that the oxidation reaction product grows into and embeds the filler. In another optional embodiment of the present invention, one or more dopants may be provided in the parent metal to aid the oxidation reaction. Moreover, the permeable mass of filler may be formed into a preform and the preform may optionally be provided with a barrier material on at least one surface thereof to produce a self-supporting ceramic composite body of predetermined shape. The self-supporting ceramic composite body is recovered and in a separate subsequent operation, the surface is coated with one or more materials in order to effect desired changes in the properties of the surface, e.g. hardness, corrosion resistance. Moreover, it is also possible to provide the surface of the self-supporting ceramic or ceramic composite body with one or more materials to effect desired changes in the properties of the body (e.g., at, near or substantially below the surface of the body). The coating operation may comprise chemical vapor deposition or physical vapor deposition of the desired material using one or more surfaces of the body as a substrate.

In a further aspect of the invention, the recovered body comprises interconnected metal, in addition to the interconnected ceramic matrix. Prior to the aforesaid coating operation, the parent metal comprising the matrix is displaced by a foreign metal. The body, now with the foreign metal as a primary constituent of the interconnected metal, is exposed to conditions in which the foreign metal at the surface is selectively diffusion-coated with one or more elements. These elements are chosen for their ability to effect desired changes in the properties of the exposed surface of the foreign metal.

In a still further aspect of the invention, the recovered body may be subjected to a conversion coating process which causes at least one material or component external to the body to react with metal contained in the body which is, or can be made to be, accessible from the surface of the body. An example of desirable conversion coating for use with materials of the present invention is Alodine® chromate conversion coating, which is well known to those of ordinary skill in the art. In a process which utilizes an Alodine® chromate conversion coating, a metal-containing substrate material is placed into contact (e.g., immersed, painted, etc.) with a chromate conversion solution to permit a conversion reaction to occur. By providing the self-supporting ceramic or ceramic composite body with a conversion coating, corrosion resistance, as well as other properties, may be improved.

It should be noted that while this disclosure discusses primarily ceramic and ceramic composite bodies made by the directed reaction of a molten parent metal, it is possible that some of the coating techniques, especially the conversion coating technique, may produce desirable results in many different bodies, at least a portion of which comprises a metallic constituent.

Additionally, in certain cases, it may be desirable to provide a substrate body containing a conversion coating with an additional coating to provide even further improvements to the properties of the self-supporting ceramic body. Particularly attractive second coating materials for use with, for example, conversion coated substrate bodies include enamels, ethylenechlorotriflouroethylene (ECTFE) thermal plastics, polymers, resins, etc. In some cases, these second or additional coatings may also be applied as a single or exclusive coating to certain substrate materials and also provide some enhanced performance characteristics.

DETAILED DESCRIPTION OF THE INVENTION

Figure 1:
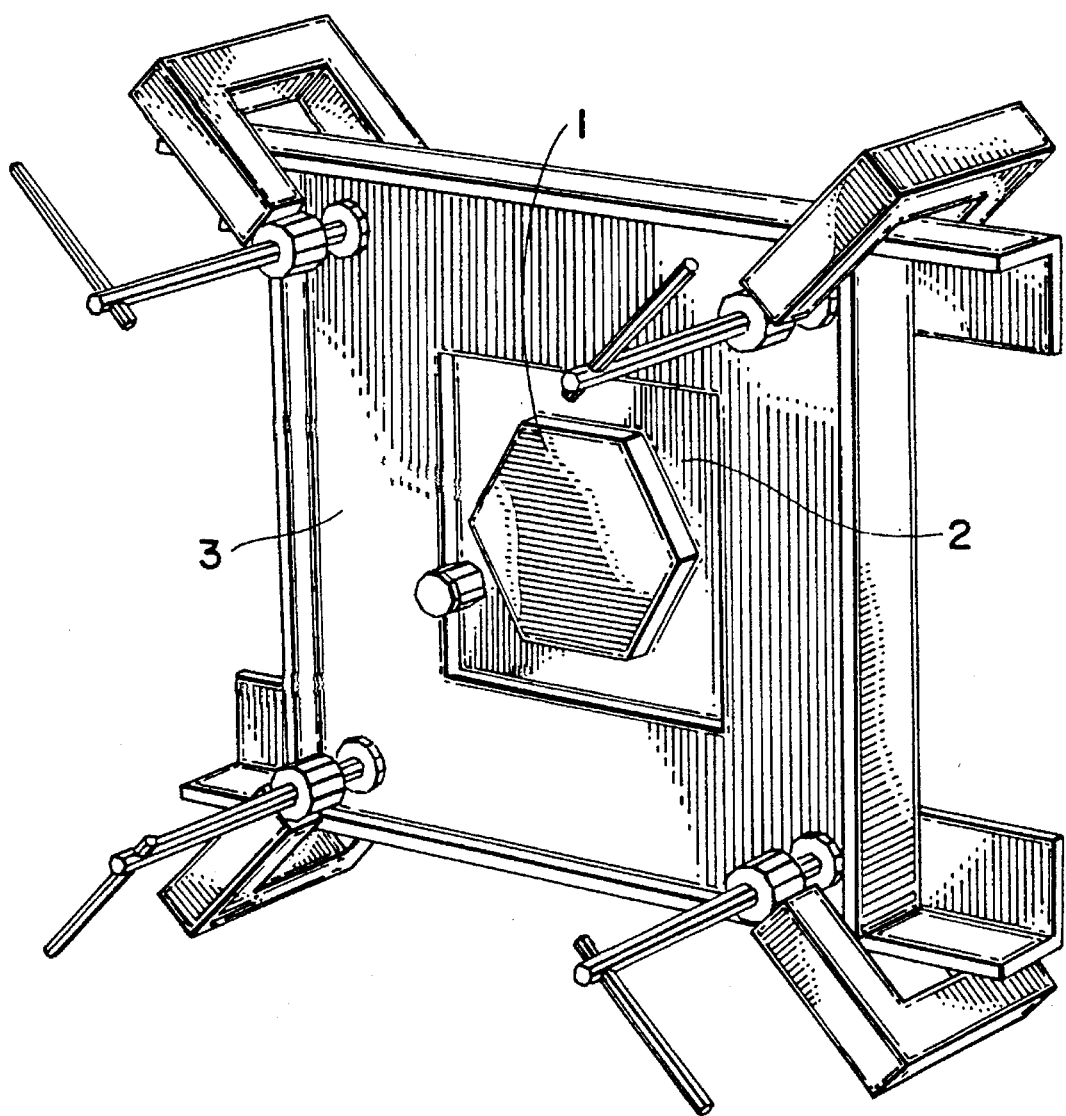
FIG. 1 is a schematic drawing of the assembly used to determine the ballistic data listed in Table I.

One aspect of the invention comprises a method of making self-supporting ceramic and ceramic composite structures by the oxidation reaction of a body of molten parent metal with a vapor-phase oxidant to form an oxidation reaction product. Molten metal is drawn through the oxidation reaction product towards the oxidant to cause continued growth of the oxidation reaction product at the interface between the oxidant and previously formed oxidation reaction product.

In a preferred embodiment, a permeable mass of filler is positioned adjacent to the parent metal body so that the oxidation reaction product grows into and embeds the filler. The filler may comprise a bed of unbonded and substantially inert particles. Alternatively, the filler particles may be bonded together to form a rigid preform which preferably has the size and shape of the required end product.

In another optional embodiment of the present invention, one or more dopants may be provided in the parent metal, on its surface, or dispersed into or coated onto the filler to aid the oxidation reaction.

Optionally, a barrier material may be provided as a layer defining a surface of said filler, the material being chosen to inhibit further oxidation of the parent metal or infiltration by its reaction product beyond the barrier layer. The barrier layer provides a means, therefore, of defining the outside surface of the required ceramic body.

Optionally, the permeable mass of filler may be of a predetermined geometry (i.e., a preform) and at least one surface of the preformed filler material may be provided with a suitable barrier means which will inhibit growth of the oxidation reaction product beyond its boundaries.

Optionally, unoxidized parent metal is allowed to remain as a continuous network in the polycrystalline material, i.e. as interconnected metal.

Optionally, one or more alloying additions may be made to the parent metal to impart a desired improvement in properties thereof, e.g. mechanical properties, or electrical or thermal conductivities.

All the foregoing methods have been disclosed in the aforesaid Commonly Owned Patents and Patent Applications.

The improvement of the present invention resides in a method of providing a coating on one or more surfaces of the ceramic or ceramic composite product to impart one or more desired improvements to the properties of the ceramic or ceramic composite body or to its surface. As stated above herein, certain of these coating methods may be applicable to any substrate material comprising ceramic and/or any substrate material comprising metal. For instance, it may be desired to improve the surface hardness or resistance to abrasion of a ceramic or ceramic composite body. Alternatively, it may be desired to improve resistance of the surface to attack by corrosive media. Furthermore, when a ceramic or ceramic composite body is intended to be used as an armor material, one or more coating methods should be utilized to improve the ballistic performance of the underlying ceramic or ceramic composite body.

As a result, the properties of the surface of the ceramic or ceramic composite body may differ from the properties of the interior. For example, the interior may comprise material having generally desirable properties for the intended application, but lacking resistance to abrasion. Provision of an appropriate surface coating can increase surface hardness and abrasion resistance. Thus, a desirable combination of properties can be obtained.

The coating may comprise a discrete layer on the surface of the ceramic or ceramic composite body, the surface comprising a substrate which takes no part in the formation of said layer. Alternatively, the substrate may take part in the formation of the coating, e.g. by chemical reaction with one or more coating materials, as the materials or the reaction products with the substrate diffuse into the substrate. Where the self-supporting body comprises interconnected metal, the reaction to form the coating may take place selectively with the exposed surfaces of the metal.

The coating may optionally be a diffusion coating in which the coating material reacts with the interconnected metal substrate at the surface of the self-supporting body and diffuses inwardly to thicken the coating. As a result, the properties at the surface of the self-supporting body differ from those of the interior of the self-supporting body. For example, the interior of the self-supporting body may comprise tough, ductile metal which is lacking in resistance to abrasion. Provision of a coating according to the present invention on the surface of the exposed metal will provide a layer of hard, abrasion-resistant material. Thus, a desirable combination of properties of the metal and hence of the body as a whole is obtained.

Various methods may be used to deposit the coatings on the surface of the ceramic and ceramic composite articles. While many of these methods are well known per se; the invention comprises the combination of such methods with the novel methods of making the aforesaid polycrystalline ceramic and ceramic composite structures embodied in the Commonly Owned Patents and Patent Applications and with the unexpected performance of certain combinations of substrate materials with particular coating(s) combinations.

Thus, chemical vapor deposition (CVD) processes may be used to deposit the coating. The coating deposited in this way may comprise one or more elements selected from aluminum, boron, carbon, cobalt, chromium, germanium, hafnium, molybdenum, nickel, niobium, palladium, silicon, silver, tin, tantalum, titanium, vanadium, tungsten or zirconium. For example, it may be desired to deposit a boron coating on the surface of the self-supporting body. This may be done by heating the body in a vapor phase comprising a volatile boron compound such as boron hydride, $B_2H_6$, at a temperature of 40°–700° C. Alternatively, the atmosphere may comprise a mixture of boron trichloride, $BCl_3$, and hydrogen and the required temperature would then be 1000°–1500° C. The coating deposited by either of the aforesaid exemplary methods may simply comprise elemental boron. However, if a body in which the metal is, for example, aluminum, has boron deposited on the surface thereof from, for example, a boron hydride precursor, at a temperature below the 660° C. approximate melting point of aluminum, the boron reacts selectively with the surface layer of the aluminum matrix to form an aluminum boride. This provides a hard surface on said matrix, combined with a tough ductile metal network in the interior of the body, this being a very desirable combination of properties.

Alternatively, one or more of said elements may be deposited on the surface of the body by a physical vapor deposition process. For example, silver, aluminum, copper, molybdenum, niobium, nickel, platinum, silicon, tantalum, titanium, and tungsten are examples of metallic elements which can be deposited on a substrate by one or more sputtering processes.

Various compounds can be deposited on one or more surfaces of the body according to the method of the invention. Thus, carbides of boron, chromium, hafnium, molybdenum, niobium, silicon, tantalum, titanium, vanadium, tungsten, and zirconium can be deposited by chemical vapor deposition processes. For example, boron carbide, $B_4C$, can be deposited on the one or more surfaces of the body by heating the body to a temperature of 1200°–1900° C. in an atmosphere comprised of a mixture of boron trichloride vapor, $BCl_3$, with various carbon-containing gases such as carbon monoxide or various organic gases such as methane, together with hydrogen. Boron carbide provides a hard, wear-resistant coating material.

Alternatively, one or more of said carbides may be deposited on the surface of the body by a physical vapor deposition process. For example, carbides of chromium, molybdenum, silicon, tantalum, titanium and tungsten can be deposited by reactive sputtering in which a plasma is established locally at the surface on which deposition is to be effected and a reactive gas together with appropriate target material is transported into the plasma. Carbide is formed by reaction of the gas with the target material prior to deposition on the substrate.

Nitrides of aluminum, boron, hafnium, niobium, tantalum, silicon, titanium, tungsten or zirconium can be deposited by chemical vapor deposition processes. For example, boron nitride, BN, can be deposited on one or more surfaces of the body by heating the body to a temperature of 1000°–2000° C. in an atmosphere comprised of a mixture of boron trichloride of trifluoride and ammonia.

Boron nitride provides a hard, wear-resistant coating material.

Alternatively, one or more of said nitrides may be deposited on the surface of the body by a physical vapor deposition process. For example, nitrides of aluminum, hafnium, niobium, tantalum, titanium, and tungsten can be deposited by the reactive sputtering process referred to hereinabove.

Oxides of aluminum, chromium, silicon, tantalum, tin, titanium, zinc, and zirconium can be deposited by chemical vapor deposition processes. For example, zirconium oxide, $ZrO_2$, can be deposited on one or more surfaces of the body by heating at a temperature of about 1000° C. in an atmosphere comprised of a mixture of zirconium tetrachloride vapor, $ZrCl_4$, carbon dioxide, carbon monoxide, and hydrogen. Zirconium oxide provides a hard wear- and oxidation-resistant surface coating.

Alternatively, one or more of said oxides may be deposited by a physical vapor deposition process. For example, zirconium oxide can be deposited by a sputtering process.

A further embodiment of the invention comprises a method of producing self-supporting ceramic or ceramic composite bodies having a modified metal-containing component including first providing according to the methods disclosed in the aforesaid Commonly Owned Patents and Patent Applications a self-supporting ceramic or ceramic composite body comprising a polycrystalline material comprising (i) an oxidation reaction product formed upon oxidation of a molten parent metal precursor with an oxidant, optionally embedding a filler material, and (ii) an interconnected metal-containing component at least partially accessible from one or more surfaces of said ceramic or ceramic composite body. The surface or surfaces of the ceramic or ceramic composite body is contacted with a quantity of foreign metal different from said interconnected metal-containing component at a temperature and for a time sufficient to allow for interdiffusion, whereby at least a portion of said metal-containing component is displaced by said foreign metal. The resulting ceramic or ceramic composite body, having an altered metal-containing component, and exhibiting modified or improved properties, is recovered and in a separate, subsequent operation, the foreign metal on the surface of the component is selectively diffusion coated with one or more elements. These elements effect desired changes in one or more properties of the exposed surface of the foreign metal component.

Diffusion coating elements may comprise one or more of boron, carbon, nitrogen or chromium or mixtures thereof. Foreign metals which can advantageously be used in the invention are those readily forming one or more borides, carbides, nitrides, or chromium compounds with the diffusion coating elements. Such foreign metals may be selected, for example, from chromium, iron, manganese, molybdenum, nickel, niobium, silicon, titanium, tungsten, or vanadium.

The embodiment may be readily understood and exemplified where iron is the foreign metal. Iron can be readily surface-hardened by carburizing processes well known to those skilled in the art. For example, the body containing an iron interconnected metal constituent can be packed in a bed of granular carbon-bearing material, for example, graphite, and heated. In a preferred embodiment, gas carburizing is used wherein the active carburizing agent is a hydrocarbon gas such as methane, propane, or butane, or the like. The body is heated for a period of 5 to 30 hours at a temperature of 800°–1000° C. depending on the desired thickness of the carburized layer in an atmosphere comprising one or more of the aforementioned gases. Iron carbide, $Fe_4C_3$, is formed by reaction of the carburizing agent with the iron foreign metal substrate at the surface thereof. The iron carbide diffuses at a rate determined by the time and temperature within the aforesaid range into the foreign metal constituent to provide a surface coating of the desired thickness.

An alternative means for surface hardening iron is by a nitriding treatment, well known to those skilled in the art. The active nitriding agent is typically anhydrous ammonia although other reactive nitrogen-containing gases and gas mixtures can be used. The body is heated for a period of 5–80 hours at a temperature typically within the range of 500°–600° C. in an atmosphere comprising the aforesaid nitriding agent. Iron nitride is formed by reaction of the nitriding agent with the foreign metal substrate at the surface thereof. The iron nitride diffuses at a rate determined by the time and temperature within the aforesaid range into the foreign metal. The thickness of the iron nitride surface layer is thereby determined.

Yet a further alternative means for surface hardening is by a carbo-nitriding treatment well known to those skilled in the art wherein both iron carbide and iron nitride are simultaneously formed. For example, the component can be immersed in a molten bath of sodium or potassium cyanide. In a preferred embodiment, gaseous carbo-nitriding is used wherein the active agents comprise a mixture of one or more of the aforesaid carburizing gases containing a minor proportion of ammonia. The body is heated for a period of 1 to 5 hours at a temperature within the range of 800°–1000° C. in an atmosphere comprising the aforesaid carbo-nitriding agents. Both iron carbide and iron nitride are formed by reaction of the iron foreign metal constituent of the substrate with the carbo-nitriding agents. The carbides and nitrides so formed diffuse into the exposed metal surfaces of the body. The time and temperature of the exposure to the aforesaid conditions determine the thickness of the surface layer of iron carbide and nitride.

Boron and chromium can be selectively diffusion coated onto the foreign metal constituent by chemical vapor deposition processes as disclosed hereinabove.

Furthermore, it may be desirable to provide the ceramic or ceramic composite body of the present invention with a conversion coating to improve, for example, its corrosion resistance.

For example, chromate conversion coatings have been widely used to provide corrosion resistance and improve adhesion of organic coatings to aluminum substrates. However, the application of such coatings to composite bodies, and the attendant advantages, are new. Generally, when chromate conversion coatings are applied to an aluminum substrate, a chromate film is formed on the aluminum from an acidic, aqueous solution containing hexavalent chromium and other film-forming and modifying chemicals. Reaction of the metal surface with the solution results in formation of an amorphous gel composed largely of chromic hydroxides in which chromate is occluded. The coating acts as a reservoir of inhibitive hexavalent chromium (chromate) which is leached out when moisture is present and prevents corrosion of the underlying metal. The leaching action also provides self-healing properties to the underlying metal when the metal is exposed by scratching or abrasion of the chromate coating.

Such chromate conversion coatings may be applied by, for example, brushing the solution on to the substrate, or immersing the substrate into a chromate conversion coating solution.

However, it has been unexpectedly discovered that the bodies of the present invention, which may contain about 10–40 volume percent metal, with a preferred amount being 15–25 volume percent metal, can be provided with a conversion coating to improve corrosion resistance and, possibly, to improve adhesion of organic coatings to such coated bodies.

Therefore, it should be understood that in certain instances it may be desirable to provide an underlying substrate material, a first conversion coating followed by at least one second coating which may act independently of or synergistically with the first coating to provide improved properties to the self-supporting body. In a preferred embodiment, the substrate body may first be provided with a conversion coating. For example, it may be desirable to provide the body with a chromate conversion coating with which those skilled in the art are familiar. As discussed above, chromate conversion coatings may be applied, for example, by dipping the self-supporting body in a chromate conversion coating solution at relatively low temperatures. A particularly preferred chromate conversion coating is an Alodine® chromate conversion coating. Without wishing to be bound by any particular theory or explanation, it is believed that at least a portion of the metal which may be accessible from the surface of the body is converted by the chromate conversion coating to a chemical compound, thus producing desirable property changes.

After providing the chromate conversion coating, it may be desirable to provide the body with at least a second coating. It has been discovered that attractive second coating materials may be enamels, ethylenechlorotriflouroethylene (ECTFE) thermal plastics, polymers, resins, etc. Particularly attractive coating materials, when applied to bodies which have been chromate conversion coated, are enamels such as CORLAR® epoxy-polyamid enamel (supplied by E. I. du Pont de Nemours and Company, Inc., Wilmington, Del.), IMRON® polyurethane enamel (supplied by E. I. du Pont de Nemours and Company, Inc., Wilmington, Del.) and mastic epoxy (supplied by E. I. du Pont de Nemours and Company, Inc., Wilmington, Del.), and ECTFE thermal plastics such as HALAR®, IMID® AND Edlon™ SC2001P, and thermal plastic polymers such as NUCRAL™.

In a particularly preferred embodiment it has been unexpectedly discovered that when the bodies of the present invention are first chromate conversion coated and thereafter provided with a second coating such as, for example, an IMRON® polyurethane enamel or an ECTFE thermal plastic (e.g., HALAR®, IMID® and Edlon™ SC2001P), that when the bodies are used as armor material, ballistic performance as well as corrosion resistance may be improved (discussed later herein).

The present invention is further demonstrated by the following non-limiting Example.

EXAMPLE 1

This Example demonstrates a method for forming a shaped ceramic matrix composite body by growing an oxidation reaction product into a permeable mass of filler material that has a predetermined shape (i.e., a preform) said permeable mass being provided with a barrier material to inhibit growth of the oxidation reaction product beyond the defined boundaries of the preform.

An alumina refractory boat was constructed by situating two L-shaped alumina plates on a flat alumina plate such that an alumina refractory boat having internal dimensions of about 5 inches (127 mm) wide by about 14 inches (356 mm) long by about 3⅜ inches (86 mm) high was formed. Approximately 8½ pounds of 500 grit 39 CRYSTOLON® green silicon carbide particulate (Norton Co., Worcester, Mass.) was distributed evenly into the alumina refractory boat. A total of 36 refractory boats each containing about 8½ pounds of the 500 grit green silicon carbide particulate were prepared in this manner. The boats were then arranged within Unique air atmosphere furnaces at about room temperature. The top vent of the furnaces were closed and the air circulation fans were turned off. The temperature within each furnace was raised from about room temperature to about 1325° C. in about 25 hours. When the furnace temperatures reached about 1325° C., the top vent in each furnace was opened and the air circulation fans were turned on. After maintaining a temperature of about 1325° C. for about 30 hours, power to the furnaces was turned off and the furnace temperatures were allowed to cool to room temperature.

After the furnace temperatures had reached room temperature, the alumina boats were removed from the furnaces and disassembled and it was noted that the 500 grit green silicon carbide particulate had rigidized, thus forming silicon carbide bricks. The silicon carbide bricks were then run through a jaw crusher to produce "prefired" silicon carbide particulate material. The prefired silicon carbide particulate material was collected and thereafter placed into a SWECO® vibratory mill and thereafter a SWECO® vibratory separator (Sweco, Inc., Toronto, Canada). The vibratory mill and separator were turned on and the prefired silicon carbide particulate was subjected to grinding, by alumina grinding media contained in the mill, and then vibrated and sieved through a 100 mesh screen in the separator. The prefired silicon carbide particulate was thereafter recovered and separated into about 50 pound lots. Each 50 pound lot was placed into a 7½ gallon fiber drum. The drums were sealed and placed on a jar roller for about 30 minutes.

About 13,050 grams of 180 grit 39 CRYSTOLON® green silicon carbide particulate and about 8700 grams of the prefired silicon carbide particulate were placed into a 7½ gallon fiber drum. The drum was securely sealed and the drum containing the silicon carbide particulate mixture was placed on a jar roller for about 20 minutes. The jar roller was then turned off, and the silicon carbide mixture was recovered.

About 17,400 grams of 90 grit 39 CRYSTOLON® green silicon carbide particulate was added to the mixing bowl of a Model #V1401 140 quart Hobart mixer (Hobart Corp., Troy, Ohio). About 2610 grams of STA DEX® Dextrin No. 124 (A. E. Staley Manufacturing Co., Decatur, Ill.) was then added to the mixing bowl. Additionally, about 47,850 grams of 54 grit 39 CRYSTOLON® green silicon carbide particulate was added to the Hobart mixing bowl.

The 90 grit silicon carbide, the STA DEX® Dextrin No. 124 and the 54 grit silicon carbide were then mixed for about 5 minutes by turning the Hobart mixer on at a speed setting of No. 1 on the control panel.

While the mixer was running, about 544 grams of NYACOL 2040NH$_4$ colloidal silica (Wesbond Corp., Wilmington, Del.) and about 979 grams of deionized water were mixed together in a 2000 milliliter NALGENE® plastic jar (Nalge Company, Rochester, N.Y.).

After the 90 grit silicon carbide/STA DEX® Dextrin No. 124/54 grit silicon carbide mixture had been subjected to mixing for about 5 minutes, the NYACOL 2040NH₄ colloidal silica/deionized water mixture was then slowly added to the Hobart mixer, and the mixture was mixed for an additional 5 minutes.

After about 5 minutes, about 21,750 grams of the 180 grit green silicon carbide particulate/prefired silicon carbide particulate mixture was added to the mixing bowl using an Accu Rate Dry Material Feeder (Accu Rate, Whitewater, Wis.) set at a feed rate of about 500. The Hobart mixer was simultaneously set to a speed setting of No. 2 on the control panel. After about 10 minutes, essentially all of the 180 grit green silicon carbide particulate/prefired silicon carbide particulate mixture had been added to the mixing bowl. The entire contents of the mixing bowl was then subjected to mixing at the No. 2 setting speed for about 25 minutes.

After about 25 minutes, an about 20 gram sample of the mix was removed from the mixing bowl and utilizing a Mettler LP16 moisture balance the moisture content of the mixture was determined to be about 1.4%. To determine the moisture content of the mix, the temperature setting on the Mettler LP16 moisture balance was set at about 100° C. and the mix was subjected to this temperature for about 10 minutes. After ensuring that the moisture content of the mixture was about 1.4%, the Hobart mixer was turned off and the mixture was placed into a 30 gallon plastic-lined container. The container was tightly sealed in an attempt to maintain the moisture content of the mixture. The container and its contents were stored at about room temperature for about 12 hours.

After about 12 hours, the plastic-lined container was opened and a sample of the mixture was removed and transferred to a Model D 300 30 quart Hobart mixer and mixed for about 5 minutes. After about 5 minutes, an about 20 gram sample of the mix was removed from the Hobart blender and, using the Mettler moisture balance, its moisture content was established to be about 0.85%.

A hexagonal die cavity having internal dimensions of about 3.965 inches (101 mm) measuring from parallel edge to parallel edge and about 1¼ inches (32 mm) deep was set up in a 200 ton press. Approximately 285.5 grams of the silicon carbide mixture was placed into a 500 milliliter plastic beaker. The mixture was then stirred utilizing a plastic pick in order to break up any lumps that had formed. The mixture was then placed into the die cavity and a level surface was established within the cavity. The mixture was then subjected to about 90 tons of pressure in order to condense the mixture into a preform. The preform was removed from the die and it was noted that the preform measured about 3.965 inches (101 mm) from parallel edge to parallel edge with a thickness of about 0.55 inches (14 mm).

A total of 594 preforms were prepared in the above manner.

A barrier material to be applied to the outer surfaces of the preforms was prepared in the following manner. About 9000 grams of ethanol was placed into a NALGENE® plastic jar. About 112.5 grams of KLUCEL® LF hydroxypropylcellulose (Aqualon Company, Hopewell, Va.) was slowly added to the jar while the ethanol was subjected to mixing using a CAFRAMO RZR50 Stirrer (CAFRAMO, Wiarton, Canada). After the hydroxypropylcellulose was substantially completely in solution, about 6000 grams of NYAD® −325 mesh fine wollastonite (NYCO®, Willsboro, N.Y.) was slowly added to the jar while the mixing continued. After all of the fine wollastonite was added to the mixing bowl, the mixture was subjected to an additional 10 minutes of mixing utilizing the CAFRAMO Stirrer. After about 10 minutes, the stirrer was turned off and the NALGENE® plastic jar was sealed. The jar and its contents were then placed on a jar mill and subjected to rolling for about 1 hour.

After the preforms had dried at room temperature for about 12 hours, 15 preforms were strategically arranged on a ⅛ inch (3.18 mm) thick Fiberfrax® paper tray measuring about 18 inches (457 mm) by about 25.5 inches (648 mm). The tray and preforms were then placed onto a turntable within a ventilated spray booth. A Binks HVLP spray gun was used to apply the barrier mixture to the six sides and the top surface of each preform. The tray was rotated on the turntable such that the top surface and all of the sides of each preform were given a fine coating of barrier material. A total of about 0.85 gram of barrier material was applied to each preform. All 594 preforms were provided with a barrier material in essentially the same manner.

After permitting the barrier material to dry on the preforms for at least one hour, the preforms were coated with a second coat of barrier material in essentially the same manner as described above.

A mixture which facilitated initiation of the growth of oxidation reaction product ("initiation") was prepared in the following manner. About 1700 grams of ethanol and about 1700 grams of 45 micron silicon metal powder (which contained about 0.5% iron), (Elkem Metals Co., Pittsburgh, Pa.) were added to a one gallon plastic jar. The contents of the jar were thoroughly mixed utilizing the CAFRAMO RZR50 Stirrer. After thoroughly mixing the contents of the jar, the CAFRAMO RZR50 Stirrer was turned off and the jar and its contents were removed.

The barrier coatings on the preforms were allowed to dry for at least one hour and the preforms were then turned over so that the surface which had not been coated by the barrier material faced up. Any residual barrier material was removed from the uncoated surface. The uncoated surface of the preforms were then lightly coated with about 1 gram of the initiator mixture utilizing a foam brush. The initiator mixture was allowed to dry substantially completely.

An about ¾ inch (19 mm) thick layer of NYAD® FP wollastonite coarse grade (NYCO®, Willsboro, N.Y.) was established within a refractory boat having internal dimensions of about 28 inches (711 mm) wide by about 30 inches (762 mm) long by about 3 inches (76.2 mm) deep. A level surface was established within the refractory boat. A parent metal ingot comprising about 3% Zn, 3.4% Cu, 16.7% Si, 0.25% Mn, 0.91% Fe, 0.24% Mg, 0.03% Sn, 0.03% Ni, 0.06% Cr, 0.04% Ti, and the balance aluminum, and measuring about 24 inches (610 mm) wide by about 26 inches (660 mm) long by about ¾ inch (19 mm) high was placed into the refractory boat and onto the bed of NYAD® FP coarse grade wollastonite with its smoothest surface facing up. The parent metal ingot was adjusted so that the top surface of the ingot was substantially level.

A total of 33 preforms were placed into the refractory boat and onto the parent metal ingot such that the surfaces of the preforms which had been coated with the initiator mixture were in contact with the parent metal ingot. The preforms were geometrically arranged so that a space of about ¼ inch (6.4 mm) was provided between each preform and between the preforms and the edge of the parent metal ingot. It was noted that an about ¼ inch (6.4 mm) space remained between the top edge of the boat and the top surfaces of the preforms.

A quantity of NYAD® FP coarse grade wollastonite was then carefully placed into the refractory boat, over the preforms and over the parent metal ingot. Coarse grit wollastonite was then cleared from the tops of the preforms utilizing a small paint brush. The coarse grit wollastonite was leveled to a surface substantially even with the top surface of the preforms but somewhat higher near the edges of the refractory boat.

This procedure was repeated until a total of 594 preforms were arranged in a similar manner.

The boats containing the layups were then placed into a Harrop air atmosphere furnace. The furnace contained 18 boats, with 6 boats situated on 3 separate shelves such that about 1¼ inches (31.75 mm) remained between the top of the boats and the bottom of the shelf above the boats. The vent at the top of the furnace was closed, the fan was turned off and the furnace door was sealed.

A stainless steel purge tube was utilized to establish an oxygen flow within the furnace. An oxygen flow rate of about 300 cubic feet per hour was established and the temperature within the furnace was raised from about room temperature to about 900° C. at a rate of about 80° C. per hour. The oxygen flow rate was adjusted to maintain an oxygen concentration of about 65% within the furnace. After maintaining a temperature of about 900° C. and an oxygen level of about 65%, for about 65 hours, the oxygen flow rate was interrupted completely and the temperature within the furnace was programmed to decrease to about room temperature at a rate of about 80° C. per hour.

Upon reaching about room temperature, the refractory boats were removed from the furnace.

A light hammer blow was applied to each parent metal carcass to separate the now formed ceramic composite bodies from the parent metal carcass. The ceramic composite bodies were then placed on a 60 inch (1524 mm) diameter turntable within a Wheelabrator grit blaster (Model #WMT60, the Wheelabrator Corporation, Shenandoah, Ga.) with the surface that had been in contact with the parent metal facing down. The top surfaces and sides of the ceramic composite bodies were subjected to grit blasting (utilizing GL25 Steel grinding media obtained from Wheelabrator) at 50% power for about 3 minutes. The ceramic composite bodies were turned over and the surface of the composites which had been in contact with the parent metal and the sides were subjected to grit blasting at about 70% power for about 5 minutes. All 594 ceramic composite bodies were subjected to grit blasting in substantially the same manner as described above.

A sample of the ceramic composite bodies were next chromate conversion coated by Hillock Anodizing in Philadelphia, Pa., using Alodine® 1200 chromate conversion coating. After being subjected to the chromate conversion coating, the composites were coated with an Ethylenechlorotriflouroethylene (ECTFE) thermal plastic. Specifically, an Edlon™ SC2001P ECTFE coating was applied by Edlon Products, Inc. located in Avondale, Pa.

A second sample of ceramic composite bodies were treated with the same Alodine® 1200 chromate conversion coating as described above. The composites were next coated with an enamel coating. Specifically, the composites were coated with IMRON® (a polyurethane enamel from E. I. du Pont de Nemours and Company, Wilmington, Del.). Finally, the composites were then coated with an IMRON® polyurethane enamel which contained zinc as an additive.

These coated ceramic composite bodies were then evaluated ballistically. Specifically, Table I lists the ballistic data obtained from testing bodies formed in this Example 1. The test data show ballistic results from self-supporting bodies which were tested in: (a) the as-fabricated form (i.e., without a coating); (b) provided first with an Alodine® 1200 chromate conversion coating (provided by Hillock Anodizing, Philadelphia, Pa.) and secondly with an Edlon™ SC2001P ECTFE thermal plastic coating; and (c) a first Alodine® 1200 chromate conversion coating and a second coating of IMRON® polyurethane enamel coating (the second coating comprised a first layer of IMRON® polyurethane enamel without zinc (provided by E. I. du Pont de Nemours and Co., Wilmington, Del.) and a second layer of IMRON® polyurethane enamel which contained zinc as an additive.)

To obtain the ballistic data listed in Table I, targets were constructed in the following manner. The self-supporting bodies referred to above were attached via hook and loop to an about 7 inch (178 mm) by about 7 inch (178 mm) high hard steel (MIL 46100) plate (2). The targets were clamped between two ⅜ inch (9.5 mm) thick RHA armor plate frames (MIL A 12560G) (3), each measuring about 12 inches (305 mm) by about 12 inches (305 mm) having an about 6 inch (152 mm) by about 6 inch (152 mm) hole in which the self-supporting bodies were centered. FIG. 1 provides a schematic view of the targets used to obtain the ballistic data of Table I.

The ballistic data was obtained by measuring the ballistic limit velocity for a 50 percent probability for protection (V50) determined by the Langlie method (according to procedures set forth in the U.S. Army Test and Evaluation Command Test Operations Procedure DRSTE-RP-702-101).

Table II lists the ballistic data obtained from testing bodies which were formed substantially in the same manner as described in Example 1. However, the ballistic data listed in Table II was obtained from testing self-supporting bodies which measured about 3 inches (76 mm) by about 3 inches (76 mm) by about 0.55 inch (14 mm) thick. Furthermore, the ballistic data of Table II lists the results obtained from testing both as fabricated self-supporting bodies (i.e., without a coating) and self-supporting bodies first coated with an Alodine® 1200 chromate conversion coating (provided by Hillock Anodizing, Philadelphia, Pa.) and secondly with an Edlon™ SC2001P ECTFE thermal plastic coating. The bodies were tested in a manner similar to that described above.

Thus, Example 1 shows that bodies formed in accordance with Example 1, when provided with a first chromate conversion coating and a second coating comprising either an IMRON® polyurethane enamel or an Edlon™ SC2001P ECTFE thermal plastic coating, show improved ballistic performance relative to uncoated bodies formed in accordance with Example 1.

TABLE I

| Coating | Backplate Thickness | | Body Thickness | | Number of Targets Tested | V50 feet per second | V50 Standard Deviation feet per second |
| --- | --- | --- | --- | --- | --- | --- | --- |
| | Average (inches) | Standard Deviation (inches) | Average (inches) | Standard Deviation (inches) | | | |
| AS FABRICATED BODIES | 0.262 | 0.004 | 0.557 | 0.002 | 12 | 3211 | 173 |
| Alodine ® 1200 Chromate Conversion Coated then Coated with Edlon ™ SC2001P ECTFE thermal plastic as described in Example 1 | 0.263 | 0.004 | 0.558 | 0.003 | 12 | 3286 | 176 |
| Alodine ® 1200 Chromate Conversion Coated then Coated with IMRON ® polyurethane enamel as described in Example 1 | 0.264 | 0.003 | 0.564 | 0.004 | 12 | 3327 | 92 |

TABLE II

| Coating | Backplate Thickness Standard Deviation (inches) | Body Thickness Standard Deviation (inches) | | Number of Targets Tested | Average Coating Thickness$^A$ (inches) | V50 feet per second | V50 Standard Deviation feet per second |
| --- | --- | --- | --- | --- | --- | --- | --- |
| | (inches) | (inches) | (inches) | | | | |
| 3" × 3" Bodies Without Coatings | 0.269 | 0.003 | 0.558 | 0.002 | 12 | None | 3474 | 115 |
| 3" × 3" Bodies first coated with Alodine ® 1200 chromate conversion coating and then coated with Edlon ™ SC2001P ECTFE thermal plastic | 0.272 | 0.004 | 0.558 | 0.003 | 12 | 0.034 | 3618 | 20 |

$^A$Coating thickness includes both Alodine ® 1200 chromate conversion coating and the Edlon ™ SC2001P ECTFE coating. The coating thickness reflects coating material on both sides of the bodies.

What is claimed is:

1. A self-supporting ceramic composite body comprising:
   (1) a ceramic matrix which consists essentially of
      (i) interconnected crystallites of an essentially single phase polycrystalline oxidation reaction product of a parent metal with a vapor-phase oxidant, and about 1 to 40 percent by volume of
      (ii) a metallic constituent consisting of one or more non-oxidized constituents of said parent metal, and optionally,
      (iii) voids;
   (2) one or more inert fillers embedded in said matrix, and wherein said metallic constituent is dispersed in said matrix in the form of planar metal channels which are interconnected and, optionally, also in the form of substantially non-interconnected metallic inclusions, and wherein said oxidation reaction product is characterized by crystal lattice misalignments at crystallite grain boundaries which are less than the lattice misalignments between neighboring crystallites between which planar metallic channels or planar voids are disposed; and
   (3) a first coating comprising a conversion coating disposed on at least a portion of the exterior surface of said ceramic composite body and a second coating disposed on top of said first coating.

2. The self-supporting ceramic composite body of claim 1, wherein said second coating comprises at least one enamel.

3. The self-supporting ceramic composite body of claim 1, wherein said first coating comprising a conversion coating is disposed on all of said exterior surface of said ceramic composite body.

4. The self-supporting ceramic composite body of claim 1, wherein said polycrystalline oxidation reaction product comprises a material selected from the group consisting of alumina and aluminum nitride.

5. The self-supporting ceramic composite body of claim 1, wherein said filler comprises at least one material selected from the group consisting of aluminum oxide, silicon carbide, silicon aluminum oxynitride, zirconium oxide, zirconium boride, titanium nitride, barium titanate, boron nitride and silicon nitride.

6. The self-supporting ceramic composite body of claim 1, wherein said second coating comprises a polymer.

7. The self-supporting ceramic composite body of claim 1, wherein said conversion coating comprises a chromate conversion coating.

8. The self-supporting ceramic composite body of claim 1, wherein said conversion coating comprises a chromate conversion coating and said second coating comprises at least one enamel.

9. The self-supporting ceramic composite body of claim 1, wherein said second coating comprises at least one epoxy.

10. The self-supporting ceramic composite body of claim 1, wherein said second coating comprises at least one ethylenechlorotriflouroethylene thermal plastic.

11. The self-supporting ceramic composite body of claim 1, wherein said second coating comprises at least one polymer.

12. The self-supporting ceramic composite body of claim 1, wherein said second coating comprises at least one plastic.

13. The self-supporting ceramic composite body of claim 1, wherein said conversion coating comprises a chromate conversion coating and said second coating comprises at least one epoxy.

14. The self-supporting ceramic composite body of claim 1, wherein said conversion coating comprises a chromate conversion coating and said second coating comprises at least one ethylenechlorotriflouroethylene thermal plastic.

15. The self-supporting ceramic composite body of claim 1, wherein said conversion coating comprises a chromate conversion coating and said second coating comprises at least one polymer.

16. The self-supporting ceramic composite body of claim 1, wherein said conversion coating comprises a chromate conversion coating and said second coating comprises at least one plastic.

17. The self-supporting ceramic composite body of claim 1, wherein said metallic constituent is present in an amount of about 10 to 40 volume percent of said ceramic matrix.

18. The self-supporting ceramic composite body of claim 1, wherein said metallic constituent is present in an amount of about 15 to 25 volume percent of said ceramic matrix.

19. A self-supporting ceramic composite armor material comprising:

(1) a ceramic matrix which consists essentially of
  (i) interconnected crystallites of an essentially single phase polycrystalline oxidation reaction product of an aluminum parent metal with a vapor-phase oxidant, and about 1 to 40 percent by volume, of
  (ii) a metallic constituent consisting of one or more non-oxidized constituents of said parent metal, and optionally,
  (iii) voids;

(2) one or more inert fillers embedded in said matrix, and wherein said metallic constituent is dispersed in said matrix in the form of planar metallic channels which are interconnected and, optionally, also in the form of substantially non-interconnected metallic inclusions, and wherein said oxidation reaction product is characterized by crystal lattice misalignments at crystallite grain boundaries which are less than the lattice misalignments between neighboring crystallites between which planar metallic channels or planar voids are disposed; and (3) a first coating comprising a conversion coating disposed on at least a portion of the exterior surface of said ceramic composite armor material and a second coating disposed on top of said first coating, wherein at least one of said first coating and said second coating improve the ballistic performance of said ceramic composite armor material relative to an essentially identical ceramic composite armor material without said first coating and said second coating disposed thereon.

20. The self-supporting ceramic composite armor material of claim 19, wherein said polycrystalline oxidation reaction product comprises a material selected from the group consisting of alumina and aluminum nitride.

21. The self-supporting ceramic composite armor material of claim 19, wherein said filler comprises at least one material selected from the group consisting of aluminum oxide, silicon carbide, silicon aluminum oxynitride, zirconium oxide, zirconium boride, titanium nitride, barium titanate, boron nitride and silicon nitride.

22. The self-supporting ceramic composite armor material of claim 19, wherein said second coating comprises a polymer.

23. The self-supporting ceramic composite armor material of claim 19, wherein said conversion coating comprises a chromate conversion coating and said second coating comprises a polymer coating.

24. The self-supporting ceramic composite armor material of claim 19, wherein said conversion coating comprises a chromate conversion coating.

25. The self-supporting ceramic composite armor material of claim 19, wherein said conversion coating comprises a chromate conversion coating and said second coating comprises at least one enamel.

26. The self-supporting ceramic composite armor material of claim 19, wherein said conversion coating is disposed on all of said exterior surface of said ceramic composite body.

27. The self-supporting ceramic composite armor material of claim 19, wherein said first coating comprises a chromate conversion coating and said second coating comprises at least one epoxy.

28. The self-supporting ceramic composite armor material of claim 19, wherein said first coating comprises a chromate conversion coating and said second coating comprises at least one ethylenechlorotriflouroethylene thermal plastic.

29. The self-supporting ceramic composite armor material of claim 19, wherein said first coating comprises a chromate conversion coating and said second coating comprises at least one polymer.

30. The self-supporting ceramic composite armor material of claim 19, wherein said first coating comprises a chromate conversion coating and said second coating comprises at least one plastic.

31. A self-supporting ceramic composite body which consists essentially of:

(1) a ceramic matrix which consists essentially of
  (i) interconnected crystallites of an essentially single phase polycrystalline oxidation reaction product of a parent metal with a vapor-phase oxidant, and
  (ii) about 1 to 40 percent by volume of a primarily interconnected metallic constituent consisting of one or more non-oxidized constituents of said parent metal, and optionally,
  (iii) voids;

(2) one or more inert fillers embedded in said matrix, and wherein said metal constituent is dispersed in said matrix in the form of planar metal channels which are interconnected and, optionally, also in the form of substantially non-interconnected metal inclusions, and wherein said oxidation reaction product is characterized by crystal lattice misalignments at crystallite grain boundaries which are less than the lattice misalignments between neighboring crystallites between which planar metal channels or planar voids are disposed; and (3) a first coating comprising a conversion coating disposed on at least a portion of the exterior surface of said ceramic composite body and a second coating disposed on top of said first coating.

* * * * *